(12) United States Patent
Hier et al.

(10) Patent No.: US 7,226,079 B2
(45) Date of Patent: Jun. 5, 2007

(54) AIR BAG ASSEMBLY WITH TWO PIECE AIR BAG HOUSING

(75) Inventors: Michael J. Hier, Royal Oak, MI (US); Jack S. Palazzolo, Dearborn, MI (US); Joseph J. Davis, Jr., Ortonville, MI (US)

(73) Assignee: Lear Corporation, Southfield, MI (US)

( * ) Notice: Subject to any disclaimer, the term of this patent is extended or adjusted under 35 U.S.C. 154(b) by 148 days.

(21) Appl. No.: 10/143,062

(22) Filed: May 10, 2002

(65) Prior Publication Data

US 2003/0209892 A1 Nov. 13, 2003

(51) Int. Cl.
*B60R 21/205* (2006.01)
*B60R 21/20* (2006.01)

(52) U.S. Cl. .................... 280/743.2; 280/732
(58) Field of Classification Search ............. 280/732, 280/743.2, 728.3
See application file for complete search history.

(56) References Cited

U.S. PATENT DOCUMENTS

| | | | |
|---|---|---|---|
| 5,064,217 A | 11/1991 | Shiraki | |
| 5,150,919 A | 9/1992 | Sakakida et al. | |
| 5,310,213 A | 5/1994 | Mori | |
| 5,320,381 A * | 6/1994 | Barnes et al. | 280/728.3 |
| 5,332,257 A * | 7/1994 | Rogers et al. | 280/728.3 |
| 5,364,124 A * | 11/1994 | Donegan et al. | 280/730.1 |
| 5,398,958 A | 3/1995 | Taggart | |
| 5,472,228 A * | 12/1995 | Bentley et al. | 280/728.3 |
| 5,480,183 A | 1/1996 | Ward et al. | |
| 5,496,060 A | 3/1996 | Whited et al. | |
| 5,540,965 A | 7/1996 | Nishimura et al. | |
| 5,647,607 A * | 7/1997 | Bolieau | 280/728.2 |
| 5,813,693 A * | 9/1998 | Gordon et al. | 280/728.3 |
| 5,830,548 A | 11/1998 | Andersen et al. | |
| 5,836,611 A | 11/1998 | Palm | |
| 5,868,419 A | 2/1999 | Taguchi et al. | |
| 5,887,891 A | 3/1999 | Taquchi et al. | |
| 5,931,489 A | 8/1999 | Damman et al. | |
| 5,941,558 A | 8/1999 | Labrie et al. | |
| 5,975,563 A | 11/1999 | Gallagher et al. | |
| 5,997,030 A | 12/1999 | Hannert et al. | |
| 6,010,147 A | 1/2000 | Brown | |
| 6,045,154 A | 4/2000 | Walton et al. | |
| 6,089,642 A | 7/2000 | Davis, Jr. et al. | |
| 6,131,945 A * | 10/2000 | Labrie et al. | 280/728.3 |
| 6,136,415 A | 10/2000 | Spengler | |
| 6,189,916 B1 | 2/2001 | Bowers et al. | |

(Continued)

FOREIGN PATENT DOCUMENTS

DE 200 04 076 U1 7/2000

(Continued)

*Primary Examiner*—Son T. Nguyen
(74) *Attorney, Agent, or Firm*—Brooks Kushman P.C.

(57) ABSTRACT

An air bag assembly, for use with a vehicle having a panel with a breakaway door, includes an air bag housing having first and second housing portions. Each housing portion has a connection flange, and the connection flanges are positioned adjacent each other and secured together. An air bag and inflator are disposed within the air bag housing, and the inflator is operable to inflate the air bag. The assembly further includes a tether having a first end adapted to be secured to the breakaway door of the panel and a second end that is secured between the connection flanges.

36 Claims, 4 Drawing Sheets

U.S. PATENT DOCUMENTS

| | | |
|---|---|---|
| 6,193,271 B1 | 2/2001 | Shimane |
| 6,250,669 B1 | 6/2001 | Ohmiya |
| 6,325,415 B1 | 12/2001 | Zelinski et al. |
| 6,364,351 B1 * | 4/2002 | Hier et al. .............. 280/732 |
| 6,402,187 B1 | 6/2002 | Gilpatrick et al. |
| 6,431,581 B1 | 8/2002 | Wagener et al. |
| 6,435,554 B1 * | 8/2002 | Feldman .............. 280/743.2 |
| 6,454,300 B1 | 9/2002 | Dunkle et al. |
| 6,460,880 B1 * | 10/2002 | Gallagher et al. ........ 280/732 |
| 2001/0002749 A1 | 6/2001 | Usami et al. |
| 2001/0009328 A1 | 7/2001 | Derrick et al. |
| 2001/0011816 A1 | 8/2001 | Suzuki et al. |
| 2001/0026063 A1 | 10/2001 | Yokota |
| 2001/0030418 A1 | 10/2001 | Keshavaraj |
| 2001/0040365 A1 | 11/2001 | Kitagawa |

FOREIGN PATENT DOCUMENTS

| | | |
|---|---|---|
| WO | WO 99/46152 | 9/1999 |
| WO | WO 99/65738 | 12/1999 |

* cited by examiner

AIR BAG ASSEMBLY WITH TWO PIECE AIR BAG HOUSING

BACKGROUND OF THE INVENTION

1. Field of the Invention

The invention relates to an air bag assembly for use with a motor vehicle.

2. Background Art

Various air bag assemblies have been utilized with motor vehicles. Examples of prior air bag assemblies are disclosed in U.S. Pat. Nos. 5,150,919 and 5,868,419.

SUMMARY OF THE INVENTION

An air bag assembly according to the invention, for use with a vehicle having a panel with a breakaway door, includes an air bag housing having first and second housing portions. Each housing portion has a connection flange, and the connection flanges are positioned adjacent each other and secured together. An air bag and inflator are disposed within the air bag housing, and the inflator is operable to inflate the air bag. The assembly further includes a tether having a first end adapted to be secured to the breakaway door of the panel and a second end that is secured between the connection flanges.

DETAILED DESCRIPTION OF THE PREFERRED EMBODIMENTS

Figure 1:
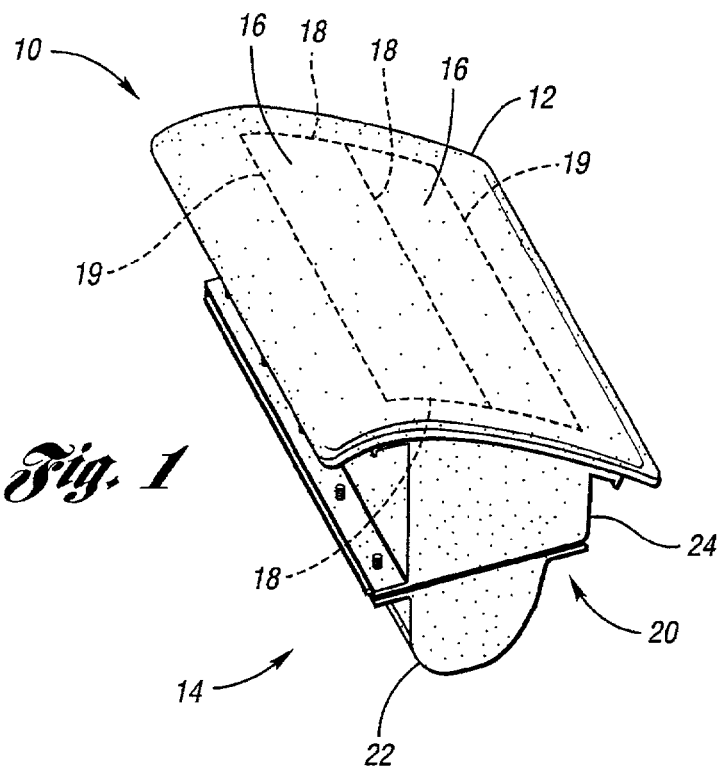
FIG. 1 is a perspective view of an air bag system, according to the invention, including an air bag assembly mounted to an instrument panel of a vehicle, wherein the air bag assembly includes a two piece air bag housing attached to the instrument panel.

FIG. 1 shows an air bag system 10 for use with a vehicle (not shown). The system 10 includes a vehicle interior panel, such as an instrument panel 12, and an inflatable bag assembly, such as air bag assembly 14, attached to the instrument panel 12. The instrument panel 12 includes one or more breakaway doors 16 that are configured to open when the air bag assembly 14 is actuated or otherwise deployed. The breakaway doors 16 may be formed, for example, by scoring the instrument panel 12 to form one or more score lines 18 and 19. The score lines 18 may function as tear lines or seams that separate when the air bag assembly 14 is deployed, and the score lines 19 may function as bend or hinge lines about which the breakaway doors 16 may pivot. The score lines 19 may also be configured to tear or otherwise separate during deployment of the air bag assembly 14. As another example, the breakaway doors 16 may be formed by stamping, milling, molding, or otherwise forming hinge lines and/or tear lines or seams.

Alternatively, the vehicle interior panel may be any suitable interior trim panel. For example, the vehicle interior panel may be a door panel, knee bolster panel, headliner panel, etc.

Figure 2:
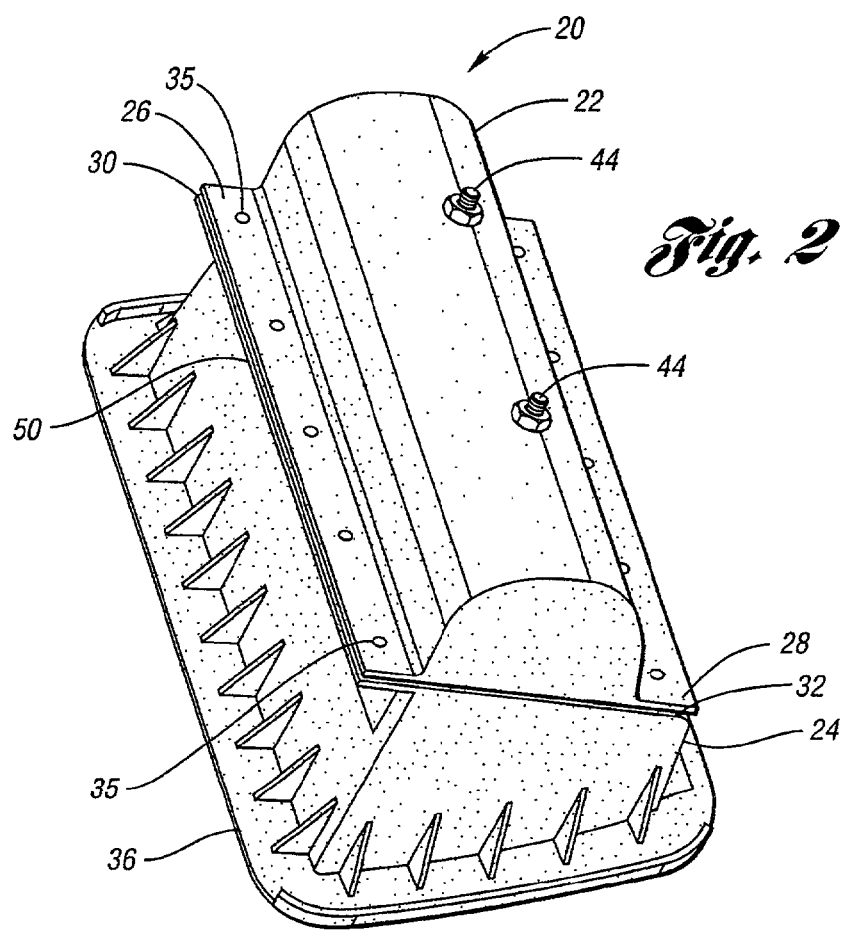
FIG. 2 is a bottom perspective view of the air bag housing showing the two pieces of the air bag housing separated slightly.
Figure 3:
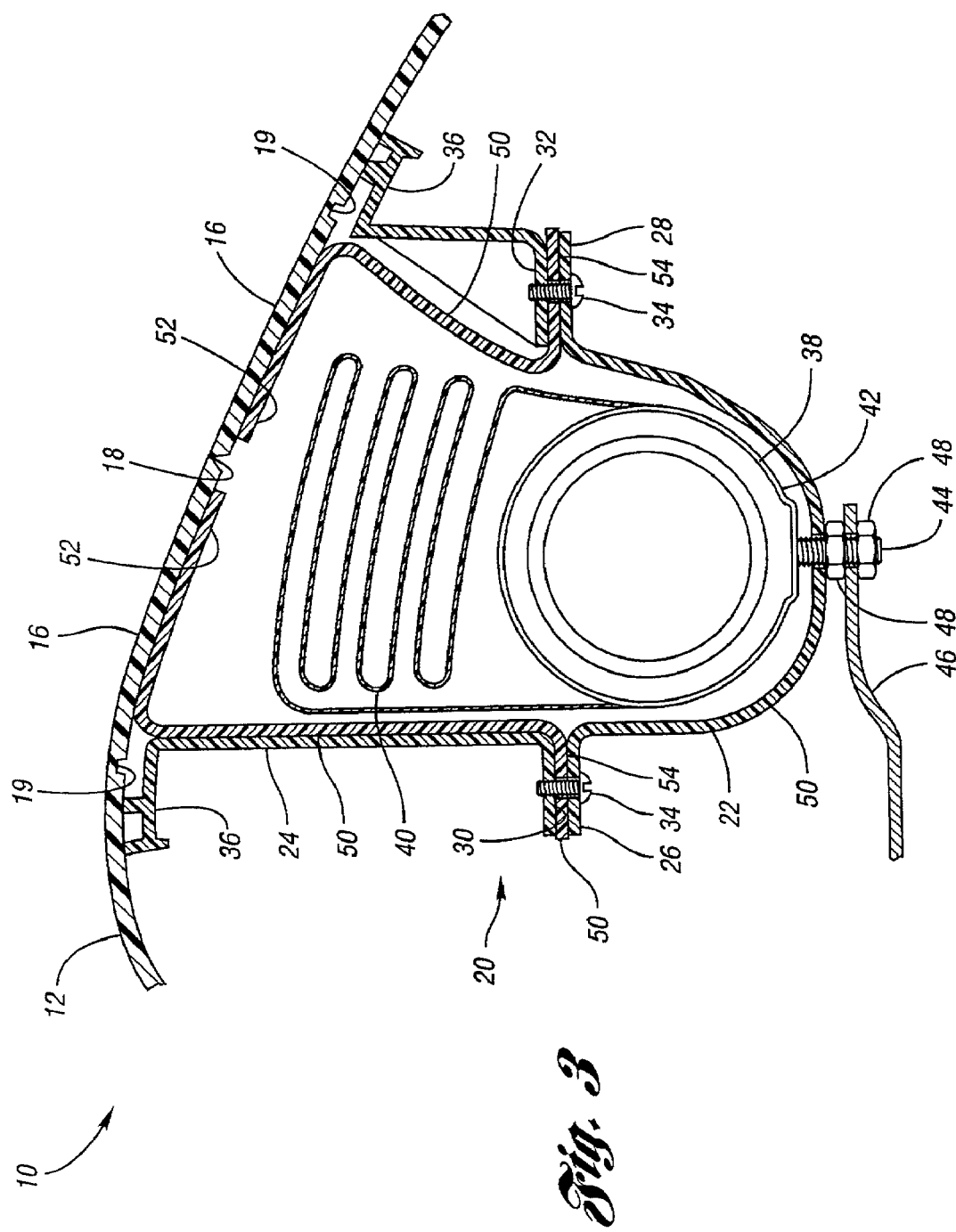
FIG. 3 is a cross-sectional view of the air bag system of FIG. 1, showing an air bag of the air bag assembly in a stored position.

Referring to FIGS. 1 through 3, the air bag assembly 14 includes an air bag housing 20 having first and second housing portions, such as lower and upper housing portions 22 and 24, respectively. The lower housing portion 22 includes first and second connection flanges 26 and 28, respectively, that are respectively positioned adjacent to first and second connection flanges 30 and 32, respectively, of the upper housing portion 24. The connection flanges 26 and 28 of the lower housing portion 22 may be connected to the connection flanges 30 and 32 of the upper housing portion 24 by multiple spaced apart fasteners 34, such as screws or bolts, that extend through corresponding apertures 35 in the housing portions 22 and 24. The upper housing portion 24 further includes a peripheral connection flange 36 that is connected to the instrument panel 12. For example, the connection flange 36 may be welded and/or adhesively attached to the instrument panel 12 away from the break away doors 16. Examples of suitable welding processes include vibration welding and sonic welding. Alternatively, the connection flange 36 may be attached to the instrument panel 12 in any suitable manner, such as with fasteners.

Because the housing 20 includes two portions 22 and 24 that are connected together, the two portions 22 and 24 may be made of different materials. For example, lower housing portion 22 may be made of metal, and upper housing portion 24 may be made of plastic. Alternatively, the portions 22 and 24 may be made of any suitable material or materials.

The air bag assembly 14 further includes an inflator 38 and an inflatable bag or air bag 40 disposed within the housing 20. In the embodiment shown in FIGS. 3 and 4, the inflator 38 is mounted to the lower housing portion 22 and is disposed at least partially within the lower housing portion 22. Furthermore, in the embodiment shown in FIGS. 3 and 4, the inflator 38 includes an inflator body 42 and one or more threaded studs 44 welded or otherwise connected to the inflator body 42. Each stud 44 extends through a corresponding aperture in the lower housing portion 22, and the studs 44 may be connected to a support bracket 46 that is connected to a support structure, such as a cross-car beam (not shown). Threaded nuts 48 may be used to connect the studs 44 to the lower housing portion 22 and to the support bracket 46. Alternatively, the inflator 38 may be secured to the lower housing portion 22, or other portion of the housing 20, in any suitable manner.

The air bag 40 is connected to or otherwise in fluid communication with the inflator 38, which is operative to inflate the air bag 40 when actuated by an actuating device (not shown). When inflated, the air bag 40 expands from a stored position, shown in FIG. 3, to a deployed position, shown in FIG. 4. In the embodiment shown in FIG. 3, the air bag 40 is disposed at least partially within the upper housing portion 24 when the air bag 40 is in the stored position.

The air bag assembly 14 also includes one or more tethers 50 connected between the instrument panel 12 and the housing 20. In the embodiment shown in FIGS. 3 and 4, the air bag assembly 14 includes two tethers 50. Each tether 50 includes a first end 52 secured to a respective breakaway door 16, and a second end 54 that is secured between a respective pair of connection flanges 26 and 30, or 28 and 32. While each first end 52 may be connected to a respective breakaway door 16 in any suitable manner, such as with fasteners and/or adhesive, in one embodiment of the invention, each first end 52 is vibration welded or sonic welded to a respective breakaway door 16. One or more fasteners 34 may also extend through the second end 54 of each tether 50 to further secure the tethers 50 between the connection flanges 26 and 30, or 28 and 32.

Figure 4:
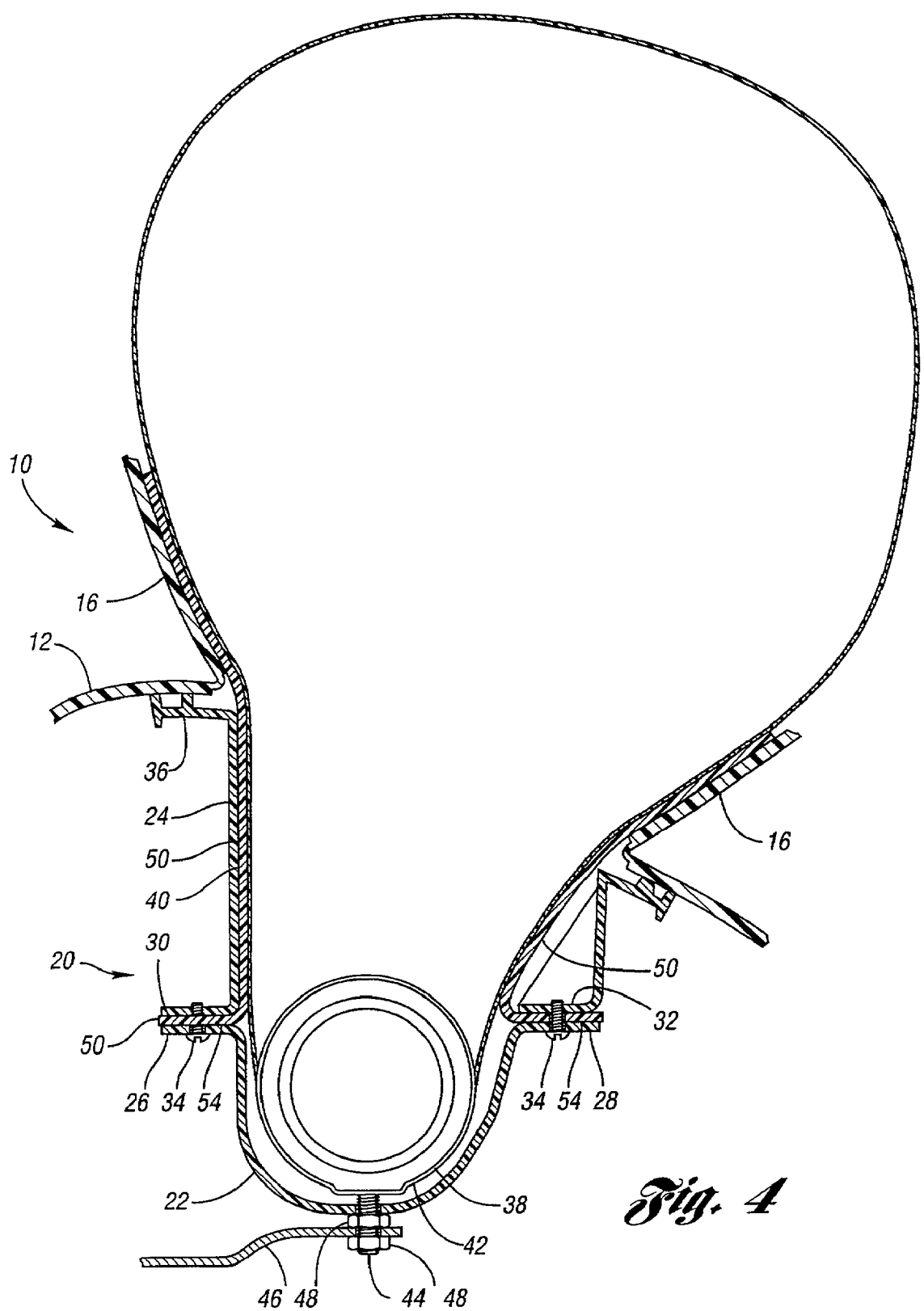
FIG. 4 is a cross-sectional view of the air bag system of FIG. 1, showing the air bag in a deployed position.

Each tether 50 functions to retain a respective breakaway door 16 during deployment of the air bag 40. As shown in FIG. 4, each tether 50 remains secured between a respective breakaway door 16 and the housing 20 when the air bag 40 is in the deployed position. Furthermore, each tether 50 may function as a hinge to allow or otherwise facilitate pivotal movement of a respective breakaway door 16 during deployment of the air bag 40. The first end 52 of each tether 50 may also be attached to a respective door 16 at multiple locations such that each tether 50 is attached to a respective door 16 substantially along the entire portion of the tether 50 that is positioned adjacent to the respective door 16.

The tethers 50 may be made of any suitable material or materials. If the tethers 50 are vibration welded to the instrument panel 12, then the tethers 50 may comprise a material that is compatible with the instrument panel 12. For example, if the breakaway doors 16 of the instrument panel 12 are made of thermoplastic polyolefin, then the tethers 50 may include a thermoplastic elastomer at least at the first ends 52. As another example, if the breakaway doors 16 of the instrument panel 12 are made of polycarbonate, polycarbonate acrylonitrile butadiene styrene, or acrylonitrile butadiene styrene, then the tethers 50 may include a thermoplastic urethane at least at the first ends 52.

According to one aspect of the invention, each tether 50 may include a sandwich construction. For example, each tether 50 may include a scrim layer, or other reinforcing layer, sandwiched between two layers of plastic, such as thermoplastic elastomer or thermoplastic urethane. As another example, each tether 50 may include a scrim layer, or other reinforcing layer, extruded within a layer of plastic, such as thermoplastic elastomer or thermoplastic urethane, such that the scrim layer is surrounded by the layer of plastic. Such a construction may extend the full length of each tether 50, or only along a portion of each tether 50, such as at one or both ends 52, 54 of each tether 50.

Referring to FIGS. 1 through 3, an example assembly procedure for the system 10 will now be described. First, the first end 52 of each tether 50 may be attached to a respective breakaway door 16, such as by welding the tethers 50 to the breakaway doors 16. Next, the upper housing portion 24 may be attached to the instrument panel 12, such as by welding the upper housing portion 24 to the instrument panel 12. Alternatively, the tethers 50 and the upper housing portion 24 may be attached to the instrument panel 12 simultaneously, or the upper housing portion 24 may be attached to the instrument panel 12 prior to attaching the tethers 50.

The lower housing portion 22 with the inflator 38 and air bag 40 mounted thereon may then be attached to the upper housing portion 24, such that each tether 50 is trapped between a pair of connection flanges 26 and 30, or 28 and 32. The lower housing portion 22 may also be attached to the support bracket 46.

Figure 5:
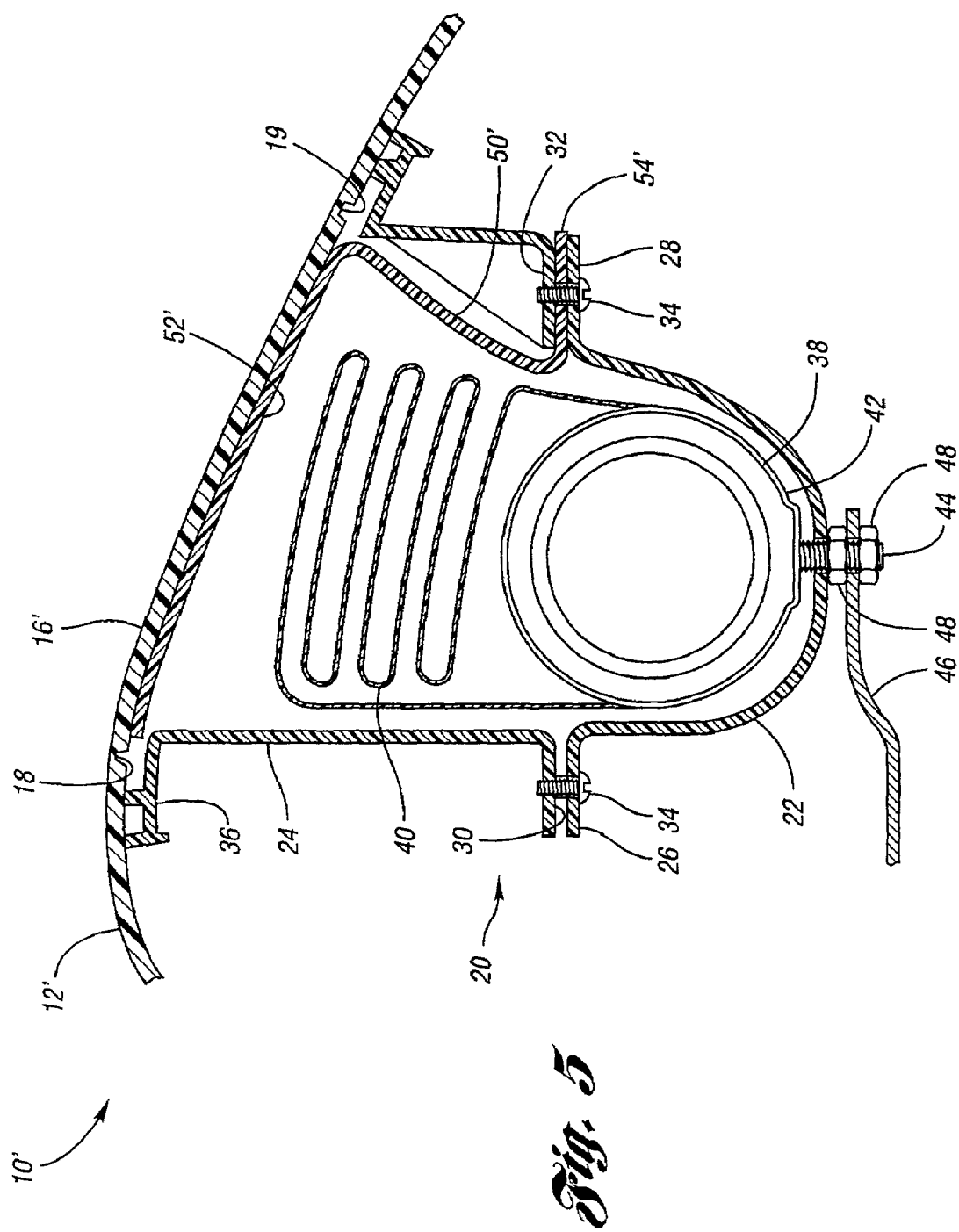
FIG. 5 is a cross-sectional view of a second embodiment of the air bag system.

FIG. 5 shows a second embodiment 10' of the system according to the invention. The system 10' is similar to the system 10 and includes similar features, which are identified with the same reference numbers. The instrument panel 12' of the system 10', however, includes only one breakaway door 16'. Furthermore, the system 10' includes only one tether 50' attached to the breakaway door 16' and housing 20. As with the system 10, the tether 50' has one end 52' secured to the instrument panel 12', and another end 54' secured between connection flanges 28 and 32 of the housing 20.

Alternatively, an air bag system according to the invention may include a panel having any suitable number of breakaway doors. Furthermore, an air bag system according to the invention may include any suitable number of tethers.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle air bag system comprising: a panel having a breakaway door;
   an air bag housing including first and second housing portions, each housing portion having first and second connection flanges, the first connection flanges being positioned adjacent each other and secured together, and the second connection flanges being positioned adjacent each other and secured together, wherein the second housing portion includes an additional connection flange that is adapted to be connected to the panel;
   an air bag disposed within the air bag housing such that the first and second housing portions are disposed outside the air bag;
   an inflator disposed within the air bag housing and operable to inflate the air bag; and
   a tether having a first end adapted to be secured to the breakaway door of the panel and a second end that is secured between the first connection flanges.

2. The air bag assembly of claim 1 further comprising multiple spaced fasteners that secure the connection flanges together.

3. The air bag assembly of claim 2 wherein one of the fasteners extends through the second end of the tether.

4. The air bag assembly of claim 1 wherein the first housing portion comprises a first material, and the second housing portion comprises a second material different than the first material.

5. The air bag assembly of claim 4 wherein the first housing portion comprises metal, and the second housing portion comprises plastic.

6. The air bag assembly of claim 1 wherein the tether comprises a thermoplastic elastomer.

7. The air bag assembly of claim 1 wherein the tether comprises thermoplastic urethane.

8. The air bag assembly of claim 1 wherein the tether comprises a sandwich construction that extends from the first end to the second end, the sandwich construction including a scrim layer sandwiched between two plastic layers.

9. The air bag assembly of claim 1 wherein the tether comprises a reinforcing layer extruded within a plastic layer.

10. The air bag assembly of claim 1 wherein the air bag housing defines a cavity for receiving the air bag and the inflator, and wherein the connection flanges extend away from the cavity.

11. The air bag assembly of claim 1 wherein the inflator is disposed at least partially within the first housing portion, and the air bag is disposed at least partially within the second housing portion.

12. The air bag assembly of claim 1 wherein the connection flanges of each housing portion are disposed on opposite sides of the air bag housing.

13. The air bag assembly of claim 1 further comprising an additional tether having a first end adapted to be secured to an additional breakaway door of the panel and a second end that is secured between the second connection flanges.

14. The air bag assembly of claim 1 wherein the second housing portion has an open end through which the air bag is deployable, the open end being configured to face toward the panel when the second housing portion is connected to the panel.

15. A vehicle air bag system comprising:
a panel having a breakaway door;
an air bag housing including first and second housing portions, each housing portion having a connection flange, the connection flanges being positioned adjacent each other and secured together, the second housing portion being connected to the panel and having an open end that faces the panel;
an air bag disposed within the air bag housing such that the first and second housing portions are disposed outside the air bag and being configured to deploy through the open end of the second housing portion;
an inflator disposed within the air bag housing and operable to inflate the air bag; and
a tether having a first end secured to the breakaway door of the panel and a second end that is secured between the connection flanges.

16. The air bag system of claim 15 wherein the panel is an instrument panel.

17. The air bag system of claim 15 further comprising multiple spaced fasteners that secure the connection flanges together.

18. The air bag system of claim 17 wherein one of the fasteners extends though the second end of the tether.

19. The air bag system of claim 15 wherein the second housing portion has an additional connection flange that is vibration welded to the panel.

20. The air bag system of claim 15 wherein the second housing portion has an additional connection flange that is adhesively attached to the panel.

21. The air bag system of claim 15 wherein the first housing portion comprises a first material, and the second housing portion comprises a second material different from the first material.

22. The air bag system of claim 21 wherein the first housing portion comprises metal, and the second housing portion comprises plastic.

23. The air bag system of claim 15 wherein the panel comprises a thermoplastic polyolefin, and the tether comprises a thermoplastic elastomer.

24. The air bag system of claim 15 wherein the panel comprises polycarbonate, and the tether comprises thermoplastic urethane.

25. The air bag system of claim 15 wherein the panel comprises acrylonitrile butadiene styrene, and the tether comprises thermoplastic urethane.

26. The air bag system of claim 15 wherein the tether comprises a sandwich construction that extends from the first end to the second end, the sandwich construction including a scrim layer sandwiched between two plastic layers.

27. The air bag system of claim 15 wherein the tether comprises a reinforcing layer extruded within a plastic layer.

28. The air bag system of claim 15 wherein the air bag housing defines a cavity for receiving the air bag and the inflator, and wherein the connection flanges extend away from the cavity.

29. The air bag system of claim 15 wherein the inflator is disposed at least partially within the first housing portion, and the air bag is disposed at least partially within the second housing portion.

30. The air bag system of claim 15 wherein the connection flange of each housing portion is a first connection flange, and each housing portion includes a second connection flange, and wherein the second connection flanges are positioned adjacent each other and secured together.

31. The air bag system of claim 30 wherein the connection flanges of each housing portion are disposed on opposite sides of the air bag housing.

32. The air bag system of claim 31 wherein the second housing portion includes a peripheral flange connected to the panel.

33. A vehicle air bag system comprising:
an instrument panel having a breakaway door;
an air bag housing including a lower housing portion and an upper housing portion, the lower and upper housing portions each having a connection flange positioned adjacent each other, the air bag housing further including spaced fasteners that secure the connection flanges of the lower and upper housing portions to each other, the upper housing portion further including an additional connection flange connected to the instrument panel;
an inflator mounted to the lower housing portion and disposed at least partially within the lower housing portion;
an air bag disposed at least partially within the upper housing portion and operable to be inflated by the inflator;
a tether having a first end secured to the breakaway door of the instrument panel and a second end that is secured between the connection flanges of the lower and upper housing portions by the spaced fasteners, the tether further having a sandwich construction that extends from the first end to the second end, the sandwich construction including a scrim layer sandwiched between two plastic layers.

34. The air bag system of claim 33 wherein the air bag housing defines a cavity for receiving the air bag and the inflator, and wherein the connection flanges extend away from the cavity.

35. The air bag system of claim 33 wherein the upper housing portion has an open end through which the air bag is deployable, the open end facing toward the panel.

36. The air bag system of claim 35 wherein the connection flange of each housing portion is a first connection flange, and each housing portion includes a second connection flange, and wherein the second connection flanges are positioned adjacent each other and secured together.

* * * * *